KEYED BURST SEPARATOR

Original Filed Oct. 6, 1966 2 Sheets-Sheet 1

Inventor:
JOHN N. PRATT
By Eugene M. Whitacre
Attorney

KEYED BURST SEPARATOR

Original Filed Oct. 6, 1966 2 Sheets-Sheet 2

Inventor:
JOHN N. PRATT
By Eugene M. Whitacre
Attorney

United States Patent Office

Re. 27,134
Reissued June 1, 1971

27,134
KEYED BURST SEPARATOR

John Norman Pratt, Indianapolis, Ind., assignor to RCA Corporation

Original No. 3,454,709, dated July 8, 1969, Ser. No. 584,770, Oct. 6, 1966. Application for reissue Jan. 19, 1970, Ser. No. 8,132
Int. Cl. H04n *9/46*
U.S. Cl. 178—5.4SY 10 Claims

Matter enclosed in heavy brackets [ ] appears in the original patent but forms no part of this reissue specification; matter printed in italics indicates the additions made by reissue.

ABSTRACT OF THE DISCLOSURE

In a color burst separator tube, the flyback pulse is used to bias the tube into conduction and to boost the effective D.C. anode voltage during the burst interval.

Figure 1:
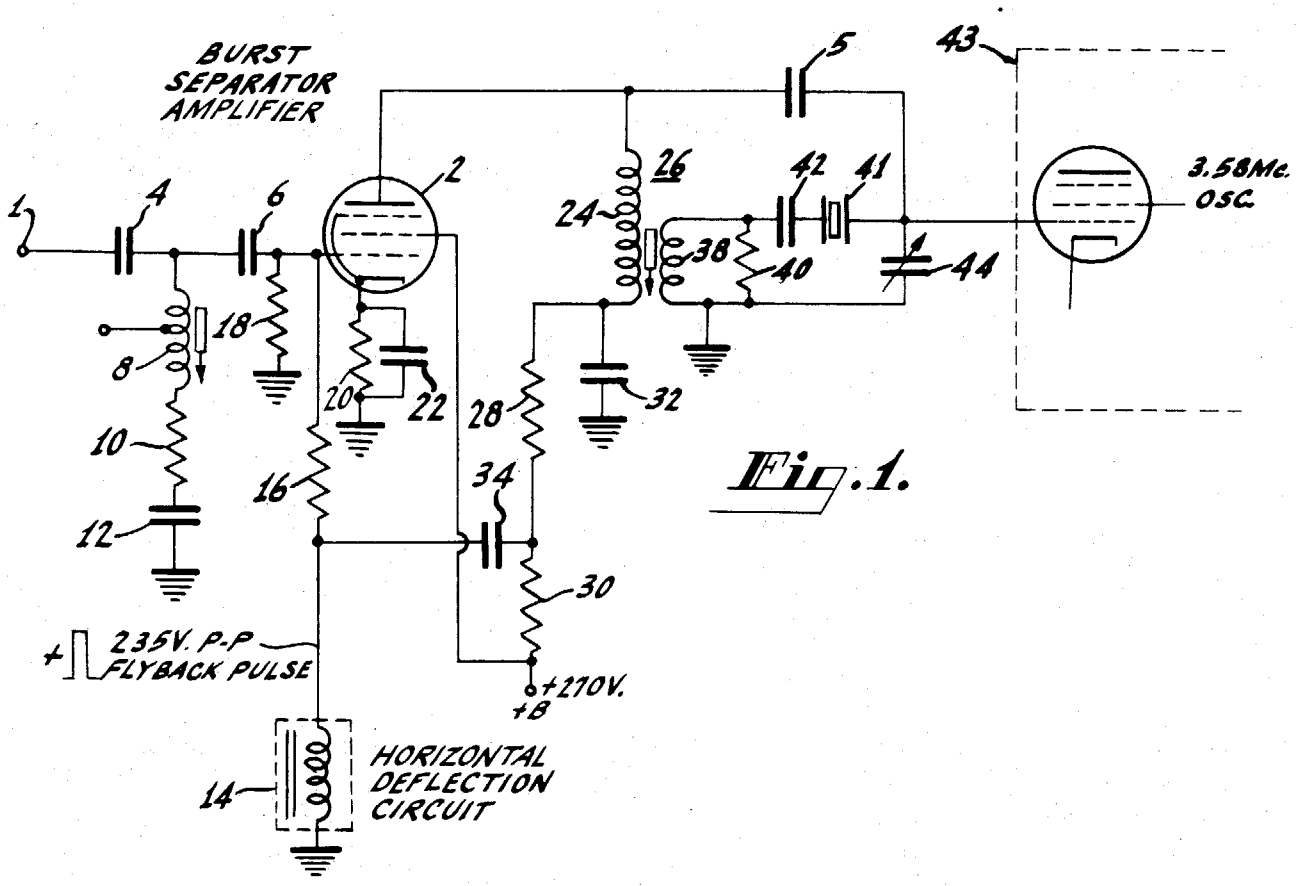

This invention relates to gating circuits and in particular, to burst separator circuits for use in color television receivers.

The color television standards used in the United States for commercial broadcasting provides for the transmission of a composite television signal including a color subcarrier wave and a color reference frequency burst comprising eight to ten cycles of 3.579 megahertz wave on the horizontal blanking pedestals immediately following the horizontal synchronizing pulses. At the receiver the burst is separated from the composite color television signal, and is used to synchronize a color oscillator to derive a wave for use in demodulating the transmitted color subcarrier wave.

Where weight and cost are important factors in the design of color television receivers, it has been found desirable to use a transformerless and hence a relatively low voltage power supply. It has been found that the operation of burst amplifier or separator circuits in such low voltage supply receivers is adversely affected in that insufficient burst voltage is provided to establish adequate phase lock of the color oscillator when the received color television signal is relatively weak.

An object of this invention is to provide an improved burst amplifier or burst separator circuit for color television receivers.

A burst amplifier circuit embodying the invention comprises an amplifying device having input, output and common electrodes. A television signal including the color burst is applied between the input and common electrodes, and an output circuit for deriving an amplifier burst is coupled between the output and common electrodes. A source of relatively low direct operating potential, such as may be derived from a transformerless power supply is connected between the output electrode and one of the other electrodes. A source providing voltage pulses in time coincidence with the color burst is applied to a control electrode of the amplifying device to key the amplifier, which is normally held cut-off, into conduction to selectively translate the color burst. The voltage pulses are also applied to the output electrode to add to the direct operating potential so that a larger amplified burst is developed in the output circuit. The color burst is used to synchronize the frequency of the color oscillator, and because of the enhanced amplitude thereof, the color oscillator is maintained in adequate phase lock over a wide range of received signal levels.

Figure 2:
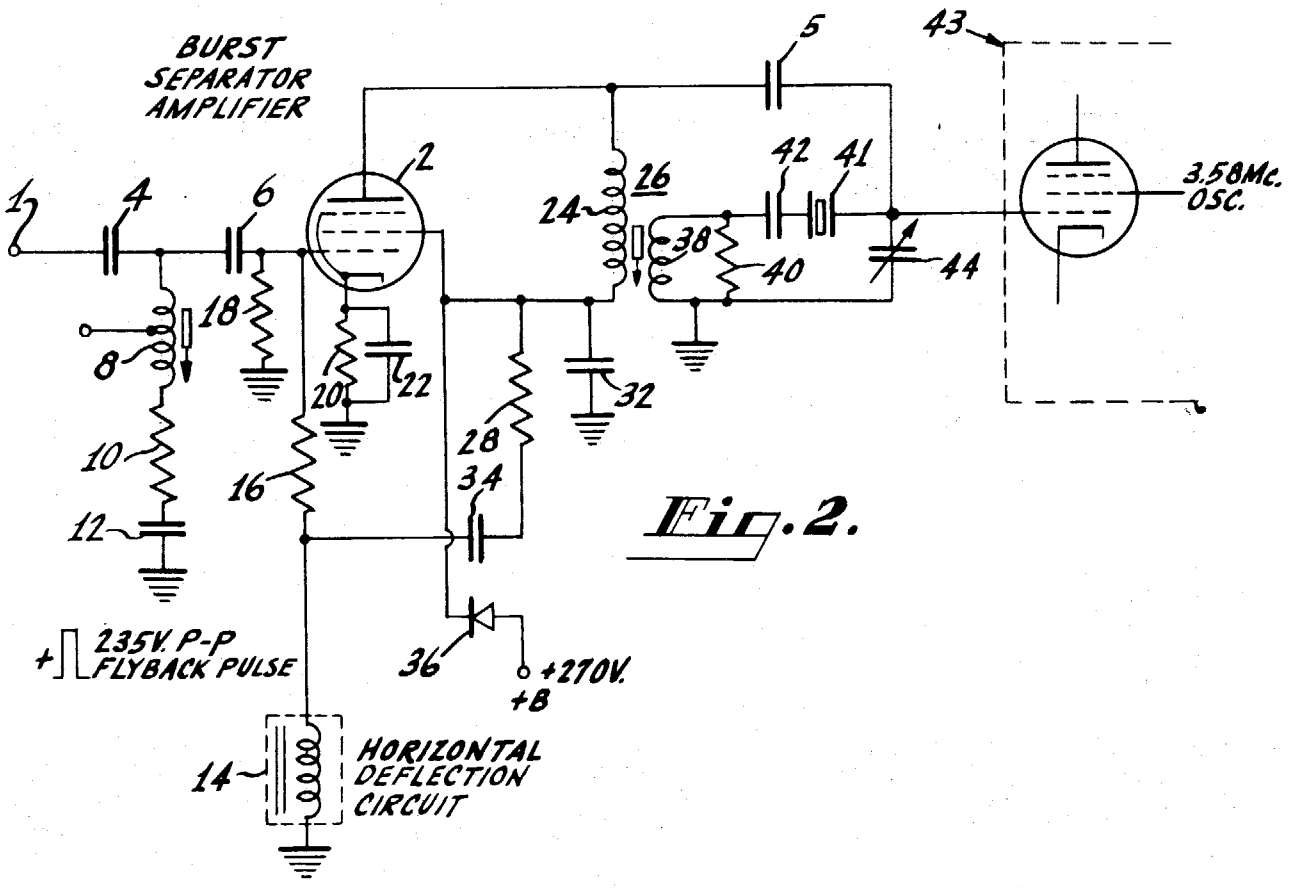

The novel features which are considered to be characteristic of this invention are set forth in the appended claims. The invention itself, however, together with additional objects and advantages thereof will best be understood by reference to the accompanying specification when read in conjunction with the drawing, in which:

FIGURE 1 is a schematic circuit diagram of a burst amplifier embodying the invention; and FIGURE 2 is a schematic circuit diagram illustrating a modification of the circuit shown in FIGURE 1.

As shown in the drawings a source of chrominance signal which contains the color burst is supplied to the control electrode of a burst separator tube 2 by means of input terminal 1 and a pair of series connected capacitors 4 and 6. A series circuit including an inductor 8, a damping resistor 10 and a signal bypass capacitor 12 is connected from the junction of the capacitors 4 and 6 to ground. The capacitor 4 and the inductor 8 provide a resonant bandpass circuit tuned to the burst frequency.

A positive-going keying pulse which is in time coincidence with the color burst is derived from a horizontal deflection circuit 14. The keying pulse is developed across a pair of resistors 16 and 18 and applied to the control grid of the burst separator tube 2. The resistors 16 and 18 attenuate the keying pulse to a suitable amplitude for causing the burst separator tube to conduct without drawing substantial grid current to minimize loading of the tuned input circuit. Current flowing through the burst separator tube 2 causes a voltage to be developed across a cathode resistor 20 and capacitor 22 which maintains the separator tube nonconductive except during the period of the keying pulse.

The anode of the burst separator tube 2 is connected through the primary winding 24 of a broadband transformer 26, and a pair of resistors 28 and 30 to a source of relatively low operating potential +B, which may, for example, be developed by a transformerless power supply, not shown. The resistors 28 and 30 are bypassed for signal frequencies by a capacitor 32. A capacitor 34 is coupled from the junction of the resistors 28 and 30 to the horizontal deflection circuit 14 to cause the positive-going voltage pulses to be superimposed on the direct operating voltage for the anode of the burst separator tube 2.

Transformer 26 includes a secondary winding 38, having a step down ratio with respect to the primary winding. The transformer secondary 38 which is loaded by a resistor 40 provides a broadband low impedance source of color burst signals which is coupled to the crystal 41 by means of capacitor 42. The crystal 41 resonates with the input capacity of the oscillator tube 43 and the shunt trimmer capacitor 44 at the color burst frequency of 3,579,545 cycles per second. It is desired that only the color reference frequency be passed by the crystal 41 to the grid of the oscillator tube 43. However, because of the crystal 41 holder capacity, a wide band of frequencies representing color burst are passed. The undesirable feedthrough is cancelled by a neutralization circuit including the capacitor 5. The burst voltage developed across the secondary 38 is out of phase with the input burst voltage to the transformer primary 24 and because of the step down turns ratio a small valued neutralization capacitor 5 will provide cancellation of the broadband of burst signal components passed by the crystal 41 holder capacity. The small valued capacitor 5 does not appreciably load resonant circuit including the crystal 41.

High peak power is required to provide sufficient energy in eight to ten cycles of 3.58 megahertz to produce an energy storage in the crystal 41 comparable with that which it is also receiving continuously from the oscillator tube 43. Most of this power is distributed among the frequency sidebands representing burst. Only a fractional part of the burst power is at the color reference frequency and is useful to excite the crystal 41 in its very narrow resonance bandwidth. It is the useful color reference carrier component at 3.58 magehertz which must be comparable with the power the oscillator 43 supplies to the crystal. Large peak burst power is therefore required from the burst amplifier to supply this color reference component to injection-lock the oscillator.

In general, an amplifier's peak power output is directly dependent on tube size and anode supply voltage which in typical color television receivers has been of the order of 400 volts. The usual procedure to obtain high power with a low voltage supply is to provide the appropriate impedance match between the selected tube and the load. Color burst amplifiers for driving crystal controlled injection locked oscillators do not have this freedom of design because a high ratio step down transformer is required. If the step down ratio is reduced, a larger valued neutralizing capacitor is required which would undesirably load the resonant circuit including the crystal. Therefore high burst power output is provided with low supply voltage by suitably increasing the anode voltage during the burst interval. This is accomplished by adding a horizontal flyback pulse to the available supply such that the voltage at the anode is increased during the burst interval.

In the embodiment shown in FIGURE 1, the positive horizontal flyback pulse supplied by the deflection circuit 14 is coupled by capacitor 34 to resistor 30 so that the pulse is added to the normal supply. Resistor 28 in combination with capacitor 32 provides isolation of the horizontal deflection flyback pulse harmonic components from the color burst transformer 26 yet permits the positive flyback pulse and supply potential to be coupled to the anode of tube 2. In this way the plate supply voltage is increased during the burst interval for increased peak burst output comparable to that achieved with higher supply voltages.

As shown in FIGURE 1 the horizontal flyback pulse is used for the dual purpose of keying on the burst amplifier to permit amplification of burst and pulsing the anode circuit to increase the available burst power output. The single source of horizontal flyback pulses 14 is coupled to the anode circuit through capacitor 34 to increase the anode voltage, and to the control grid circuit through resistors 16 and 18 to key the amplifier into conduction. As an alternative, the burst amplifier could be keyed into conduction by applying positive-going voltage pulses to the screen electrode rather than the control grid.

An alternate arrangement shown in FIGURE 2 includes an amplifier tube 2 which is keyed into conduction by a keying pulse applied to the control grid and has a pulse applied to both the anode and screen electrode to increase burst power output. The horizontal flyback pulse supplied by the deflection circuit 14 is coupled by capacitor 34 and resistor 28 to the junction between a diode 36 and the color burst transformer 26. The diode decouples the normal power supply +B when the horizontal flyback pulse increases the anode voltage of the tube 2. During the scan period the diode conducts connecting the burst transformer to the low voltage supply. The conduction of the diode at this time supplies recharging current to the capacitor 34 to replace the charge lost due to tube conduction during the burst interval. The application of the puse to the screen electrode as well as the anode electrode increases stage gain as well as peak power output. Since the tube is cut-off during scan intervals the average screen dissipation is low and is easily maintained within ratings.

A further advantage of the circuit shown in FIGURE 2 is in the waveform shaping provided by the diode 36. The waveform, as derived from the horizontal deflection circuit 14, includes a pulse portion, and in addition, may include ringing components during the scan interval. This ringing, which represents large harmonic components of the horizontal sweep frequency is coupled to the crystal oscillator 43 by means of the burst transformer 26 and associated circuitry and may cause incidental phase and amplitude modulation of the crystal oscillator output wave. The conducting diode 36 severely attenuates the ringing during the scan interval and thereby prevents the undesired phase or amplitude modulation of the crystal oscillator output signal. The action of the diode as a rectifier charges capacitor 34 to +B and causes the horizontal flyback pulse to be added to the low voltage +B stored on capacitor 34 so that the anode and screen voltages are increased by almost the peak-to-peak voltage of the pulse. In this way the diode increases anode and screen voltages during the burst interval and prevents ringing feedthrough to the crystal oscillator.

What is claimed is:

1. In a color television receiver *including* a color reference frequency *oscillator, a color reference* burst [amplifier] *separator* circuit comprising:

[amplifier means] *a vacuum tube* having [input, output and common] *at least cathode, control grid and anode* electrodes;

[an] *a signal* input circuit [for] *adapted to receive color television signals including* recurrent color burst signal components coupled between said [input and common] *cathode and control grid* electrodes, *said signal input circuit including means to maintain said vacuum tube normally cut off;* a source of voltage pulses occurring in time coincidence with the color burst signal components;

*means coupling said source of voltage pulses to said input circuit for keying said vacuum tube into conduction during the interval of said color burst signal;* color burst signal component utilization means *coupled to said anode electrode;* a source of direct operating voltage;

means coupling [said utilization means,] said source of voltage pulses and said source of direct operating voltage to the [output] *anode* electrode of said *vacuum tube* [amplifying means], for increasing the [output electrode] *supply* voltage *for said anode electrode* during the color burst interval *above the level of voltage available from said direct operating voltage source.*

2. *In a color television receiver including a color reference oscillator, a* [A] color reference frequency burst [amplifier] *separator circuit comprising:*

*a vacuum tube having at least cathode, control grid and anode electrodes;*

*a signal input circuit adapted to receive color television signals including recurrent color burst signal components coupled between said cathode and control grid electrodes, said signal input circuit including means to maintain said vacuum tube normally cut off;*

*a source of voltage pulse occurring in time coincidence with the color burst signal components;*

*color burst signal component utilization means coupled to said anode electrode;*

*a source of direct operating voltage;*

*means coupling said source of voltage pulses and said source of direct operating voltage to the anode electrode of said vacuum tube, for increasing the supply voltage for said anode electrode during the color burst interval above the level of voltage available from said direct operating voltage source;* wherein said *vacuum tube additionally includes a screen grid electrode* [input circuit includes means for normally maintaining said amplifier means cutoff]; [and] *said separator circuit* further *including* means coupling said source of voltage pulses to said input circuit to key said [amplifier means] *vacuum tube* into conduction during the interval of said color burst signal, *and means coupling said source of voltage pulses and said source of direct operating voltage to said screen grid electrode for increasing the supply voltage for said screen grid electrode during the color burst interval above the level of voltage available from said direct operating voltage source.*

3. In a color television receiver of the type including horizontal deflection circuitry responsive to a received television signal to produce voltage pulses in synchronism with received horizontal synchronizing pulses and in time coincidence with received color reference burst signals, and a low voltage power supply providing a direct operating voltage, the combination comprising:

a vacuum tube including at least an anode, cathode, and control electrode;

a signal input circuit coupled to receive television signals including said color reference burst signals coupled between said control electrode and said cathode, said signal input circuit including means to maintain said vacuum tube normally cut-off;

an output circuit coupled between said anode and said low voltage power supply so that said direct operating voltage is applied through said output circuit to said anode;

means for applying voltage pulses from said horizontal deflection circuitry between said cathode and [another] *control* electrode of said vacuum tube [other than said anode] to key said tube into conduction during the interval of said voltage pulses; and means for applying said voltage pulses to said output circuit to enhance the anode voltage during the interval of said voltage pulses.

4. In a color television receiver as defined in claim 3, a first resistor connected between said output circuit and said low voltage power supply, and wherein said means for applying said voltage pulses to said output circuit is coupled to the junction of said output circuit and said first resistor.

5. In a color television receiver as defined in claim 3, first and second resistors connected between said output circuit and said low voltage power supply, and wherein said means for applying said voltage pulses to said output circuit is coupled to the junction of said first and second resistors.

6. In a color television receiver of the type defined in claim 4, said means for applying said voltage pulses to said input circuit includes a second and third resistors across which said voltage pulses are applied, and wherein said control electrode is coupled to the junction of said second and third resistors.

7. In a color television receiver [as defined in claim 3] *of the type including horizontal deflection circuitry responsive to a received television signal to produce voltage pulses in synchronism with received horizontal synchronizing pulses and in time coincidence with received color reference burst signals, and a low voltage power supply providing a direct operating voltage, the combination comprising:*

*a vacuum tbe including at least an anode, cathode, and control electrode;*

*a signal input circuit coupled to receive television signals including said color reference burst signals coupled between said control electrode and said cathode, said signal input circuit including means to maintain said vacuum tube normally cut-off;*

*an output circuit coupled between said anode and said low voltage power supply so that said direct operating voltage is applied through said output circuit to said anode;*

*means for applying voltage pulses from said horizontal deflection circuitry between said cathode and control electrode of said vacuum tbe to key said tube into conduction during the interval of said voltage pulses; and*

*means for applying said voltage pulses to said output circuit to enhance the anode voltage during the interval of said voltage pulses;* wherein said vacuum tbe also includes a screen electrode, and said combination also includes [including] means for applying said voltage pulses to said screen electrode.

8. In a color television receiver as defined in claim 7, including a resistor and capacitor connected between said output circuit and said horizontal deflection circuit wherein the means for applying said voltage pulses to said output circuit includes the capacitor and resistor connected in series.

*9. In a color television receiver including a color reference oscillator, a color reference burst separator circuit comprising:*

*a vacuum tube having at least cathode, control grid and anode electrodes;*

*a signal input circuit adapted to receive color television signals including recurrent color burst signal components coupled between said cathode and control grid electrodes, said signal input circuit including means to maintain said vacuum tube normally cut off;*

*a source of voltage pulses occurring in time coincidence with the color burst signal components;*

*means coupling said source of voltage pulses to said input circuit for keying said vacuum tube into conduction during the interval of said color burst signal;*

*color burst signal component utilization means coupled to said anode electrode;*

*a source of direct operating voltage;*

*means coupling said source of voltage pulses and said source of direct operating voltage to the anode electrode of said vacuum tube, for increasing the supply voltage for said anode electrode during the color burst interval above the level of voltage available from said direct operating voltage source;*

*wherein said color burst signal utilization means comprises a step-down transformer having a primary winding coupled to said anode electrode and a secondary winding coupled to said color reference oscillator, said source of pulses provides desired deflection flyback pulses subject to accompaniment by undesired harmonic components, and said coupling means includes means for inhibiting the coupling of said harmonic components to said anode electrode while permitting the coupling of said flyback pulses thereto.*

*10. Apparatus in accordance with claim 9 wherein said color reference oscillator includes a piezoelectric crystal, said crystal being mounted in a holder exhibiting capacitance of a first magnitude; a signal translating device having an input electrode coupled via said crystal to said secondary winding of said step-down transformer; and a capacitor coupled between said anode electrode of said vacuum tube and said input electrode of said signal translating device, said capacitor exhibiting a capacitance of a second magnitude smaller than said first magnitude; the ratio of said first and second capacitance magnitudes substantially corresponding to the step-down ratio of said transformer.*

References Cited

The following references, cited by the Examiner, are of record in the patented file of this patent or the original patent.

UNITED STATES PATENTS

| | | | |
|---|---|---|---|
| 2,908,747 | 10/1959 | Larky | 178—5.4SYNC |
| 3,024,305 | 3/1962 | Wolfe | 178—69.5LB |

ROBERT L. GRIFFIN, Examiner

J. C. MARTIN, Assistant Examiner